United States Patent Office 2,744,933
Patented May 8, 1956

2,744,933

AMINE-SULFUR DIOXIDE-ADDITION PRODUCTS OF ACETOACETANILIDES

Wilhelm Ehm, Dormagen, Germany, assignor to Farbenfabriken Bayer Aktiengesellschaft, Leverkusen, Germany, a corporation of Germany No Drawing. Application September 29, 1953, Serial No. 383,124

Claims priority, application Germany September 30, 1952

7 Claims. (Cl. 260—562)

This invention relates to new addition products and to a process for their production. More particularly it is concerned with water-insoluble addition products containing in equimolar proportions N-substituted acetoacetamides, aromatic amines, sulfur dioxide and water.

These addition products are new compounds which, e. g. may be used as starting material for the production of substituted pyridones.

It is known that carbonyl compounds, amines and sulfur dioxide yield water-soluble addition products consisting of 1 mol of a carbonyl compound, 1 mol of an amine and 1 mol of sulfur dioxide. Ethyl acetoacetate which, due to the carbonyl group contained therein, shall be expected to be capable of undergoing this reaction, is indifferent to amines and sulfur dioxide.

I have now found that new, water-insoluble addition products can be obtained from substituted acetoacetamides of the general formula

CH₃CO.CH₂CO.NH.R wherein R stands for an aromatic radical, and aromatic amines, sulfur dioxide and water.

The most simple of the new compounds, aniline sulfite acetoacetanilide, is formed by addition of 1 mol each of acetoacetanilide, sulfur dioxide, aniline and water. The anilide radical in acetoacetanilide and aniline may be replaced by various aromatic amines. This offers the possibility of producing the new addition compounds by a variety of combinations.

METHOD OF PRODUCTION 1. 1 mol of acetoacetamide is dissolved in water by means of sulfur dioxide and another solution is prepared from 1 mol of an amine in water with the addition of sulfur dioxide. After combining the two solutions a precipitate forms after a short time.

2. Compounds, which are slightly soluble in water, are dissolved in alcoholic solution with the addition of 1 mol of water.

3. Acetoacetamide is prepared by stirring 1 mol of an aromatic amine in water with 1 mol of diketene, dissolved by introducing sulfur dioxide into the solution, separated from undissolved acetyl compounds resulting from contaminations (acetic anhydride) of technical diketene by filtering and the filtrate is mixed with a solution of 1 mol of an aromatic amine in water containing sulfur dioxide. After some time the reaction product precipitates. It is filtered off, washed, preferably with acetone, and dried at 40–50° C.

4. Two mols of an amine are dissolved in water by means of sulfur dioxide and stirred with 1 mol of diketene while cooling (the amine radicals are identical in this case).

5. Aniline sulfite acetoacetanilide is formed by stirring for instance thionylamiline, C₆H₅NSO, with diketene in water while cooling.

6. The amine radical in an amine sulfite acetoacetamide compound is replaced by a different amine; for instance aniline sulfite acetoacetanilide is converted to α-naphthylamine sulfite acetoacetanilide by treatment with a solution of α-naphthylamine containing sulfuric acid.

The yields amount to 98–100% and products of high purity are obtained.

GENERAL PROPERTIES

The amine sulfite acetoacetamide compounds are slightly soluble in a mixture of methylene chloride and methanol, substantially insoluble in other solvents and are decomposed by alkali metal-hydroxide solutions and acids into amine, amide and sulfurous acid and water. They can be titrated, therefore, while using phenolphthalein as indicator, preferably, however, the sulfur dioxide set free by the addition of acid, preferably hydrochloric acid, is distilled over and titration is carried out by means of an iodine solution.

The amine sulfite acetoacetamide compounds decompose upon heating and melt with decomposition. This results in the formation of sulfur dioxide, water, amine and, if phosphorus compounds are present, pyridone derivatives from the amide radical, for instance N-phenyl-2-pyridone-4.6-methyl-5- carboxylic acid anilide from 2.3-dimethylanilinesulfite-acetoacetanilide.

The new addition compounds react with nitrates and soluble carbonates and dicarbonates. Analogous to free sulfur dioxide they decolorize fuchsine solutions and oxidize hydrogen sulfide to sulfur.

The following amine sulfite acetoacetamides have been produced from 1 mol each of sulfur dioxide, water and—

1. Aniline and acetoacetanilide acc. to method 1,3,4, and 5,
2. 2,5-dimethylaniline and acetoacetanilide acc. to method 1,
3. 2,3-dimethylaniline and acetoacetanilide acc. to method 1,
4. 3-chloroaniline and acetoacetanilide acc. to method 1,
5. 4-chloroaniline and acetoacetanilide acc. to method 1,
6. 3,5-chloroaniline and acetoacetanilide acc. to method 1,
7. 3-chloroaniline and acetoacet-3-chloroanilide acc. to method 1,
8. Aniline and acetoacet-2-chloroanilide acc. to method 2,
9. 2,3-dimethylaniline and acetoacet-2-chloroanilide acc. to method 1,
10. 3-chloroaniline and acetoacet-2.5-dimethylanilide acc. to method 1,
11. 2,5-dimethylaniline and acetoacet-2.5-dimethylanilide acc. to method 1,
12. 4-chloroaniline and acetoacet-4-chloroanilide acc. to method 2,
13. α-Naphthylamine and acetoacetanilide acc. to method 1,
14. α-Naphthylamine and acetoacet-2-chloroanilide acc. to method 1 and 2,
15. α-Naphthylamine and acetoacet-α-naphthylamide acc. to method 4,
16. Benzidine and diacetoacetylbenzidine acc. to method 4, with the formation of polybenzidine sulfite-acetoacetanilide,
17. p-Amino benzoic acid and acetoacet-p-carboxyanilide,
18. p-Amino benzoic acid and aniline,
19. p-Amino benzoic acid methyl ester and acetoacet-p-methcarboxyanilide.

CONSTITUTION

The determination of constitution was first carried out on anilinesulfate-acetoacetanilide. In the titration with alkali-methyl hydroxide solution the quantity of solution, which is required for the sulfur dioxide content of the above composition, is consumed. By distilling the sulfur dioxide set free on treatment with acid into a receiver containing alkalimetal hydroxide solution, the same quantity, viz. one mol of sulfur dioxide per one mol of the sulfite compound, is found. By decomposing aniline sulfite acetoacetanilide with alkali metal hydroxide solution and distilling off the aniline with steam, 1 mol of aniline is determined per 1 mol of the addition compound. In the residue from steam distillation acetoacetanilide was identified only qualitatively. The presence of water in anilinesulfite acetoacetanilide is indicated by its separation in the decomposition of the compound in boiling toluene at the reflux condenser. Two phases form; the B. P. of one phase is 100° C. Finally, the amounts of the various constituents of the new addition compounds were determined by elementary analysis. All these results agree with the above-said composition of 1 mol of acetoacetanilide, 1 mol of aniline, 1 mol of water and 1 mol of sulfur dioxide $(C_6H_5NH_2)(H_2SO_3)$ $(CH_3COCH_2CONHC_6H_5)$.

I wish to call special attention to polybenzidinesulfite acetoacetanilide $(CH_2N.C_6H_4.C_6H_4NH_2).(yH_2SO_3).(CH_3COCH_2$
$CONH.C_6H_4.O_6H_4.NHCOCH_2COCH_3)_x$ prepared according to method 4, since it is formed from two bifunctional compounds, viz. benzidine and its secondarily formed diacetoacetate with the formation of different polymers. In the above formula $y$ represents a number between 1 and 2 depending upon the degree of polymerization which is indicated by the symbol $x$.

In the monomeric product $(NH_2C_6H_4.C_6H_4NH_2)(H_2SO_3)(CH_3COCH_2$
$CONHC_6H_4NHCOCH_2COCH_3)$ the proportion of sulfur atoms to nitrogen atoms is 1:4. When the polymerization degree of the compounds increases the nitrogen content decreases and approaches a maximum ratio of 1 atom of sulfur to 2 atoms of nitrogen. For instance, the product described further below has a nitrogen content of 7.9% and an equally large sulfur content. This corresponds to a molecular ratio of sulfur to nitrogen 1:2.3. The product, therefore, does not reach the highest possible limiting value of sulfur to nitrogen (1:2) due to its comparatively low polymerization degree.

The invention is further illustrated by the following examples without being restricted thereto.

PRODUCTION OF AMINE SULFITE ACETOACETAMIDES

EXAMPLE 1

Aniline sulfite acetoacetanilide $(C_6H_5—NH_2)(H_2SO_3)(CH_3COCH_2CONHC_6H_5)$ OR
$C_{16}H_{20}O_5N_2S$ (A) *Production according to method 3*

One mol of aniline is quickly stirred with 15–20 times the quantity of water and reacted with one mol of diketene. After the reaction yielding acetoacetanilide, sulfur dioxide is introduced into the solution of the reaction product. Minor quantities of acetanilide formed from aniline and acetic anhydride, which is associated with diketene as contamination, are separated by filtering and the solution is stirred with one mol of aniline (or a solution of aniline in aqueous sulfur dioxide solution). The resultant precipitate of aniline sulfite acetoacetanilide is filtered off after some hours, washed with little water and acetone and dried at moderately elevated temperature, preferably in vacuum. The yields are almost quantitative. M. P. 114–118° C. The product is insoluble in water and acetone. It decomposes upon heating and, therefore, cannot be recrystallized by dissolving in hot organic solvents and cooling. It can be dissolved at a minor proportion, however, at ordinary temperature in a mixture of methylene chloride and methanol and precipitated by cooling. Recrystallization is not absolutely necessary since the product is obtained directly in a very pure state.

| Analysis | found, percent | calculated, percent |
| --- | --- | --- |
| carbon | 54.5 | 54.5 |
| hydrogen | 5.5 | 5.7 |
| oxygen | 22.6 | 22.8 |
| nitrogen | 7.9 | 7.9 |
| sulfur | 8.9 | 9.1 |
|  | 99.40 | 100.00 |
| found by decomposition: |  |  |
| sulfur dioxide | 17.6 | 18.2 |
| aniline | 25.00 | 26.25 |

1 gram of aniline sulfite acetoacetanilide consumes 56.8 cc. of $n/10$ sodium hydroxide solution, calculated 56.3 cc., corresponding to a found quantity of sulfur of 9%.

(B) *Production according to method 4*

Two mols of aniline are reacted in 20 liters of water with 1 mol of concentrated technical sodium sulfite solution; 1 mol of preferably diluted sulfuric acid is carefully run in with stirring or the aniline is dissolved by introducing sulfur dioxide. Thereupon one mol of diketene is gradually added. (Care has to be taken that the solution is not heated up). After some hours the reaction product is filtered with suction, washed with water and dried in the air or in vacuum.

(C) *Production according to method 5*

Two mols of thionylaniline are vigorously stirred with cooling with 15–20 times the volume quantity of water and one mol of diketene. The resulting precipitate of aniline sulfite acetoacetanilide is filtered after some hours, well washed with water and at least with acetone and dried in the air. M. P. 114° C.

| Analysis | found, percent | calculated, percent |
| --- | --- | --- |
| carbon | 54.5 | 54.5 |
| nitrogen | 7.9 | 7.9 |
| sulfur dioxide | 17.6 | 18.2 |

The following compounds were produced according to method 3, if not otherwise stated.

EXAMPLE 2

2,5-dimethylanilinesulfite acetoacetanilide $((CH_3)_2C_6H_3NH_2)(H_2SO_3)(CH_3COCH_2CONHC_6H_5)$ or $C_{18}H_{24}N_2O_5S$ is produced from 1 mol of 2,5-dimethylaniline, 1 mol of acetoacetanilide, 1 mol of sulfur dioxide and 1 mol of water. It melts at 100° C. with decomposition.

| Analysis | found, percent | calculated, percent |
| --- | --- | --- |
| carbon | 56.17 | 56.70 |
| hydrogen | 6.17 | 6.36 |
| oxygen | 21.10 | 21.10 |
| nitrogen | 7.34 | 7.39 |
| sulfur | 8.50 | 8.45 |
|  | 99.28 | 100.00 |

0.3576 gram of the substance consumes 18.6 cc. of $n/10$ sodium hydroxide solution, calculated 18.8 cc., corresponding to a found content of sulfur of 8.3%.

EXAMPLE 3

2,3-dimethylanilinesulfite acetoacetanilide $((CH_3)_2C_6H_3NH_2)(H_2SO_3)(CH_3COCH_2CONHC_6H_5)$ or $C_{18}H_{24}O_5N_2S$ is produced from 1 mol of 2,3-dimethylaniline, 1 mol of acetoacetanilide, 1 mol of sulfur dioxide and 1 mol of water. The product melts at 102° C. with decomposition.

| Analysis | found, percent | calculated, percent |
|---|---|---|
| carbon | 56.85 | 56.80 |
| hydrogen | 6.45 | 6.32 |
| oxygen | 21.34 | 21.10 |
| nitrogen | 6.88 | 7.36 |
| sulfur | 8.15 | 8.42 |
| | 99.67 | 100.00 |

0.4596 gram of the substance consumes 24.3 cc. of $n/10$ sodium hydroxide solution, calculated 24.18 cc., corresponding to a found content of sulfur of 8.45%.

EXAMPLE 4

4-chloroanilinesulfite acetoacetanilide $(ClC_6H_4NH_2).(H_2SO_3).(CH_3COCH_2CONHC_6H_5)$ or $C_{16}H_{19}O_5N_2ClS$, is produced according to method 1. 1 mol of amine and 1 mol of anilide are dissolved in 15–20 times the quantity of water with sulfur dioxide and the solutions are combined. After some time the new compound precipitates.

| Analysis | found, percent | calculated, percent |
|---|---|---|
| sulfur dioxide content | 15.8 | 16.00 |
| chlorine content | 8.6 | 9.10 |

EXAMPLE 5

3-chloroanilinesulfite acetoacetanilide $(C_6H_4ClNH_2)$ $(H_2SO_3)(CH_3COCH_2CONHC_6H_5)$ or $C_{16}H_{19}O_5N_2ClS$ is produced from 1 mol of 3-chloroaniline, 1 mol of acetoacetanilide, 1 mol of sulfur dioxide and 1 mol of water. The compound melts at 92° C. with decomposition.

| Analysis | found, percent | calculated, percent |
|---|---|---|
| carbon | 49.76 | 49.75 |
| hydrogen | 4.94 | 4.95 |
| oxygen | 20.42 | 20.63 |
| nitrogen | 6.95 | 7.27 |
| chlorine | 8.90 | 9.08 |
| sulfur | 8.40 | 8.32 |
| | 99.37 | 100.00 |

0.224 gram of the substance consumes 1.18 cc. of $n/1$ sodium hydroxide solution, calculated 1.16 cc., corresponding to a found content of sulfur of 8.4%.

EXAMPLE 6

3.5-dichloroanilinesulfite acetoacetanilide $((C_6H_3Cl_2NH_2)(H_2SO_3)CH_3COCH_2CONHC_6H_5)$ or $C_{16}H_{18}O_5N_2Cl_2S$, is produced from 1 mol of 3.5-dichloroaniline, 1 mol of acetoacetanilide, 1 mol of sulfur dioxide and 1 mol of water. The compound melts at 113° C. with decomposition.

| Analysis | found, percent | calculated, percent |
|---|---|---|
| carbon | 45.67 | 45.67 |
| hydrogen | 4.26 | 4.28 |
| nitrogen | 6.68 | 6.66 |
| chlorine | 16.70 | 16.66 |

EXAMPLE 7

3-chloroanilinesulfite acetoacet-3-chloranilide $(C_6H_4ClNH_2) (H_2SO_3) (CH_3COCH_2CONHC_6H_4Cl)$ or $C_{16}H_{18}O_5N_2Cl_2S$ is produced from 1 mol of 3-chloroaniline, 1 mol of 3-chloro-1-acetoacetanilide, 1 mol of sulfur dioxide and 1 mol of water. The compound melts at 139° C. with decomposition.

| Analysis | found, percent | calculated, percent |
|---|---|---|
| carbon | 45.75 | 45.70 |
| hydrogen | 4.42 | 4.29 |
| oxygen | 18.90 | 19.08 |
| nitrogen | 6.67 | 6.60 |
| sulfur | 7.75 | 7.71 |
| chlorine | 16.56 | 16.62 |
| | 100.05 | 100.00 |

0.5327 gram of the substance consumes 25.6 cc. of $n/10$ sodium hydroxide solution, calculated 25.36 cc., corresponding to a determined amount of sulfur of 7.68%.

EXAMPLE 8

Anilinesulfite acetoacet-2-chloroanilide $(C_6H_5NH_2) (H_2SO_3) (CH_3COCH_2CONHC_6H_4Cl)$ or $C_{16}H_{19}O_5N_2ClS$ is produced according to method 2 by dissolving acetoacet-2-chloroanilide in ten times the quantity of methanol by means of sulfur dioxide with the addition of molecular amounts of water and admixing a solution of aniline in five times the quantity of methanol.

The desired compound precipitates after addition of an equal quantity of concentrated sodium chloride solution. The precipitate is filtered with suction washed with water containing sulfur dioxide and dried in the exsiccator. $SO_2$-content=16.75% instead of 16.83% of the theoretical. M. P. 115° C. with decomposition.

EXAMPLE 9

2,3-dimethylanilinesulfite acetoacet-2-chloroanilide $((CH_3)_2C_6H_3NH_2)(H_2SO_3)(CH_3COCH_2CONHC_6H_4Cl)$ or $C_{18}H_{23}O_5N_2ClS$ is produced from 1 mol of 2,3-dimethylaniline, 1 mol of 3-chloro-1-acetoacetanilide, 1 mol of sulfur dioxide and 1 mol of water. The compound melts at 122° C. with decomposition.

| Analysis | found, percent | calculated, percent |
|---|---|---|
| carbon | 52.25 | 52.20 |
| hydrogen | 5.87 | 5.55 |
| oxygen | 19.18 | 19.81 |
| nitrogen | 6.88 | 6.76 |
| chlorine | 8.55 | 8.45 |
| sulfur | 7.75 | 7.75 |
| | 100.48 | 100.00 |

0.2164 gram of the substance consumes 0.92 cc. of $n/1$ sodium hydroxide solution, calculated 1.04 cc., corresponding to a found amount of sulfur of 6.94%.

EXAMPLE 10

3 - chloroanilinesulfite acetoacet - 2,5 - dimethylanilide $(C_6H_4ClNH_2) (H_2SO_3)$
$(CH_3COCH_2CONHC_6H_3(CH_3)_2)$ or $C_{18}H_{23}O_5N_2ClS$ is produced from 1 mol of 3-chloroaniline, 1 mol of 2,5-dimethyl-1-acetoacetanilide, 1 mol of sulfur dioxide and 1 mol of water. It melts at 114° C. with decomposition.

| Analysis | found, percent | calculated, percent |
|---|---|---|
| carbon | 52.20 | 52.15 |
| hydrogen | 5.50 | 5.35 |
| oxygen | 19.05 | 19.35 |
| nitrogen | 6.53 | 6.76 |
| chlorine | 8.40 | 8.45 |
| sulfur | 7.80 | 7.74 |
| | 99.48 | 100.00 |

0.420 gram of the substance consumes 20.8 cc. of $n/10$ sodium hydroxide solution, calculated 20.8 cc., corresponding to a found amount of sulfur of 7.8%.

EXAMPLE 11

2,5-dimethylanilinesulfite acetoacet-2,5-dimethylanilide $((CH_3)_2C_6H_3NH_2)(H_2SO_3)$
$(CH_3COCH_2CONHC_6H_3(CH_3)_2)$ or $C_{20}H_{28}O_5N_2S$ is produced from 1 mol of 2,5-dimethylaniline, 1 mol of acetoacet-2,5-dimethylanilide, 1 mol of sulfur dioxide and 1 mol of water; the compound melts at 124° C. with decomposition.

| Analysis | found, percent | calculated, percent |
|---|---|---|
| carbon | 58.77 | 58.80 |
| hydrogen | 7.10 | 6.86 |
| oxygen | 19.35 | 19.60 |
| nitrogen | 6.88 | 6.88 |
| sulfur | 7.80 | 7.86 |
| | 99.90 | 100.00 |

0.235 gram of the substance consumes 11.75 cc. of $n/10$ sodium hydroxide solution, corresponding to a found amount of sulfur of 8%.

EXAMPLE 12

4 - chloroaniline - sulfite acetoacet - 4 - chloro - anilide $(ClC_6H_4NH_2)(H_2SO_3)(CH_3COCH_2CONHC_6H_4Cl)$ or $C_{16}H_{18}O_5N_2Cl_2S$ is produced according to method 2 by dissolving the amine and the amide in ten times the quantity of methanol, introducing sulfur dioxide, adding water and combining the solutions. After standing for 14 days a small amount of a crystallized precipitate forms; the $SO_2$ content of the precipitate is 13.88% instead of the theoretical of 15.24%. M. P. 115° C. with decomposition.

EXAMPLE 13

α-Naphthylamine-sulfite acetoacetanilide $(C_{10}H_7NH_2)(H_2SO_3)(CH_3COCH_2CONHC_6H_5)$ or $C_{20}H_{22}O_5N_2S$ is produced from 1 mol of α-naphthylamine, 1 mol of acetoacetanilide, 1 mol of sulfur dioxide and 1 mol of water. M. P. 148° C. with decomposition.

| Analysis | found, percent | calculated, percent |
|---|---|---|
| carbon | 60.1 | 59.8 |
| hydrogen | 5.5 | 5.48 |
| oxygen | 19.65 | 19.90 |
| nitrogen | 7.00 | 6.96 |
| sulfur | 8.15 | 7.96 |
| | 100.40 | 100.00 |

Anilinesulfite acetoacetanilide is stirred several times with a solution of α-naphthylamine containing sulfurous acid, filtered each time and washed with water containing sulfur dioxide and acetone and dried in the air. M. P. 148° C. 1 gram of the substance consumes 4.7 cc. (instead of 4.97 cc. of the theoretical) of $1/n$ sodium hydroxide solution, corresponding to a found amount of sulfur of 7.5%.

EXAMPLE 14

α-Naphthylaminesulfite acetoacet-2-chloroanilide $((C_{10}H_7NH_2)(H_2SO_3)CH_3COCH_2CONHC_6H_4Cl)$ or $C_{20}H_{21}O_5N_2ClS$ is produced according to method 1: by dissolving o-chloroaniline acetoacetate by means of sulfur dioxide in at least fifty times the quantity of water and casting the solution into an aqueous solution of α-naphthylamine containing sulfur dioxide; according to method 2: by dissolving o-chloroaniline acetoacetate in ten times the quantity of methanol with molecular amounts of water and mixing with a solution of α-naphthylamine in five times the quantity of methanol containing sulfur dioxide. The yield amounts to 100% of the theoretical. $SO_2$=content: 13.1%; (13.4% of the theoretical).

EXAMPLE 15

α-Naphthylaminesulfite acetoacet-α-naphthalide $(C_{10}H_7NH_2)(H_2SO_3)(CH_3COCH_2CONHC_{10}H_7)$ or $C_{24}H_{24}O_5N_2S$ is produced by preparing a suspension of 2 mols of α-naphthylamine in about 10 liters of water and introducing sulfur dioxide until dissolution. If necessary, the solution is decolorized with animal charcoal and filtered. 1 mol of diketene is added with stirring. The diketene dissolves and, after some time, the desired compound, α-naphthylaminesulfite acetoacet-α-naphthalide, precipitates. The compound is filtered with suction, washed with water and acetone and dried at moderately elevated temperature (30–40° C.).

| Analysis | found, percent | calculated, percent |
|---|---|---|
| carbon | 64.1 | 63.8 |
| hydrogen | 4.5 | 4.4 |

1 gram of the substance consumes 4.25 cc. of $1/n$ sodium hydroxide solution (4.45 of the theoretical). This corresponds to a found sulfur content of 6.7% (7.1% of the theoretical). Titration is carried out by heating the substance with methanol and an excess of alkali metal hydroxide solution to about 40° C. and titrating back the excess alkali metal hydroxide solution with phenolphthalein as indicator after a short time.

EXAMPLE 16

Polybenzidine sulfite acetoacetbenzidide $((H_2N.C_6H_4.C_6H_4.NH_2)_2(H_2SO_3)$
$(CH_3COCH_2CONH.C_6H_4C_6H_4.NHCOCH_2COCH_3))_x$ is produced by dissolving 1 mol of benzidine in eight times the quantity of water with sulfur dioxide and stirring with 1 mol of diketene while cooling. The precipitate formed after a short time is filtered with suction, washed and dried at low temperature, if desired, over a drying agent. Yield 100%.

| Analysis | found, percent | monomer calculated, percent | highest polymer calculated, percent |
|---|---|---|---|
| carbon | 53.85 | 62.9 | 54.7 |
| hydrogen | 5.56 | 5.62 | 5.15 |
| oxygen | | 15.00 | 22.9 |
| nitrogen | 7.9 | 10.5 | 8.1 |
| sulfur | 7.9 | 5.98 | 9.15 |
| | | 100.00 | 100.00 |

EXAMPLE 17 p-Aminobenzoic acid-sulfite acetoacet-p-carboxyanilide $HOOCC_6H_4NH_2.H_2O.SO_2.$
$CH_3COCH_2CONHC_6H_4COOH$ is produced by dissolving 1 mol of p-aminobenzoic acid with sulfur dioxide in a very small amount of water, for instance 1 liter, and stirring with ½ mol of diketene. After addition of an equal quantity of concentrated sodium chloride solution and standing for a prolonged time the reaction product precipitates. The precipitate is filtered with suction, washed with water and dried in the air. The reaction product melts at 221° C. with decomposition. $SO_2$-content of the crude product: 12.45% (14.5% of the theoretical). The yield amounts to 50%.

Example 18

Anilinesulfiteacetoacet-p-carboxyanilide $C_6H_5NH_2 \cdot H_2O \cdot SO_2 \cdot CH_3COCH_2CONHC_6H_4COOH$ is produced by dissolving 1 mol of p-aminobenzoic acid with $SO_2$ in about 1 liter of water, adding 1 mol of diketene and 1 mol of aniline with stirring until dissolution. After standing for 14 days the precipitate is filtered with suction and dried in the air. Yield: 40%. M. P. 223° C. with decomposition. $SO_2$-content of the crude product: 13.3% (16.2% of the theoretical).

Example 19 p-Aminobenzoic acid methylester sulfiteacetoacet-p-methcarboxy anilide $CH_3OOCC_6H_4NH_2 \cdot H_2O \cdot SO_2 \cdot CH_3COCH_2CONHC_6H_4COOCH_3$ is produced by dissolving 205 grams of p-aminobenzoic acidmethylester in 3 liters of water with sulfur dioxide and adding 100 cc. of diketene while cooling and stirring. A precipitate forms after some hours. The precipitate is filtered with suction, washed with water and dried in the air. Yield: 215 grams. $SO_2$ content 11.8% (13.6% of the theoretical). M. P. 125° C. with decomposition. The melt becomes clear at 185° C.–186° C. When the filtrate is used again (after precipitation) to dissolve p-aminobenzoic acid-methylester and convert same into the above sulfite compound the yield amounts to 260 grams. The compound obtained can be converted into p-methcarboxyphenylaminocrotonic acid-p-methcarboxyanilide, $CH_3OOCC_6H_4HN \cdot C(CH_3)=CHCONHC_6H_4COOCH_3$ by heating to 130–140° C. with triethyl phosphate.

I claim:

1. A process for the production of addition compounds, which comprises contacting about 1 mol of a substituted acetoacetic acid amide of the structural formula:

$CH_3CO \cdot CH_2CO \cdot NHR$ in which R is a member selected from the group consisting of phenyl, chlorophenyl, lower-alkylphenyl, naphthyl, and the acetoacetylbenzidine radical, with about 1 mol of an aromatic amine selected from the group consisting of aniline, chloroaniline, lower-alkylaniline, naphthylamine, and benzidine, and sulfur dioxide and at least 1 mol of water.

2. A process according to claim 1, wherein the aromatic amine and the sulfur dioxide are introduced in the form of a thionyl amine.

3. New addition products consisting of one mol of a substituted acetoacetic acid amide of the structural formula:

$CH_3CO \cdot CH_2 \cdot CO \cdot NHR$ wherein R is a member selected from the group consisting of phenyl, chlorophenyl, lower-alkylphenyl, naphthyl, and the acetoacetylbenzidine radical, one mol of an aromatic amine selected from the group consisting of aniline, chloroaniline, lower-alkylaniline, naphthylamine, and benzidine, one mol of sulfur dioxide, and one mol of water, said addition products being insoluble in water.

4. As a new addition product aniline sulfite acetoacetic anilide consisting of in equimolar proportions acetoacetic anilide, aniline, sulfur dioxide and water, the product being insoluble in water and acetone and decomposing upon heating.

5. As a new addition product 2,3-dimethyl aniline sulfite acetoacetic 2-chloro anilide consisting of in equimolar proportions 2,3-dimethyl aniline, acetoacetic 2-chloro anilide, sulfur dioxide and water, the said product melting at 122° C. under decomposition.

6. As a new addition product 3-chloro aniline sulfite acetoacetic 2,5-dimethyl anilide consisting of in equimolar proportions 3-chloro aniline, acetoacetic 2,5-dimethyl anilide, sulfur dioxide and water, the said product melting at 114° C. under decomposition.

7. As a new addition product α-naphthyl amine sulfite acetoacetic 2-chloro anilide consisting of in equimolar proportions α-naphthyl amine, acetoacetic 2-chloro anilide, sulfur dioxide and water.

References Cited in the file of this patent

FOREIGN PATENTS 642,206    Great Britain _____ Aug. 30, 1950